United States Patent
Koskinen

(10) Patent No.: US 10,334,471 B2
(45) Date of Patent: Jun. 25, 2019

(54) LOSSLESS BEARER RECONFIGURATION FROM USE OF LONGER TO SHORTER SEQUENCE NUMBER

(71) Applicant: Nokia Technologies Oy, Espoo (FI)

(72) Inventor: Henri Markus Koskinen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/788,124

(22) Filed: Oct. 19, 2017

(65) Prior Publication Data
US 2018/0132128 A1 May 10, 2018

Related U.S. Application Data

(60) Provisional application No. 62/417,825, filed on Nov. 4, 2016.

(51) Int. Cl.
*H04L 1/16* (2006.01)
*H04L 1/18* (2006.01)
(Continued)

(52) U.S. Cl.
CPC ....... *H04W 28/0252* (2013.01); *H04L 1/1832* (2013.01); *H04L 1/1864* (2013.01);
(Continued)

(58) Field of Classification Search
CPC . H04W 88/08; H04W 92/20; H04W 28/0252; H04W 72/1284; H04L 47/34;
(Continued)

(56) References Cited

U.S. PATENT DOCUMENTS 5,754,754 A 5/1998 Dudley et al.
7,072,973 B1 7/2006 Newson et al.
(Continued)

FOREIGN PATENT DOCUMENTS

EP 3145240 A1 * 3/2017

OTHER PUBLICATIONS

Extended European Search Report received for corresponding European Patent Application No. 17197521.2, dated Mar. 15, 2018, 7 pages.
(Continued)

*Primary Examiner* — Nizar N Sivji
(74) *Attorney, Agent, or Firm* — Squire Patton Boggs (US) LLP

(57) ABSTRACT

Various communication systems may benefit from appropriate handling of reconfiguration. For example, certain wireless communication systems may benefit from lossless bearer reconfiguration when handling a transition from the user of a longer sequence number to a shorter sequence number. A method can include determining, by a protocol entity, if a next expected highest count value among count values associated with protocol data units received is more than a pre-defined limit ahead of a lowest count value among count values associated with protocol data units expected to be received. The method can also include resetting the next expected highest count value to a new value corresponding to a predefined upper limit, conditional on the determination.

11 Claims, 3 Drawing Sheets

(51) Int. Cl.
| | |
|---|---|
| H04L 29/06 | (2006.01) |
| H04W 28/02 | (2009.01) |
| H04W 72/12 | (2009.01) |
| H04L 12/801 | (2013.01) |
| H04L 12/805 | (2013.01) |

(52) U.S. Cl.
CPC ............ *H04L 47/34* (2013.01); *H04L 47/365* (2013.01); *H04L 69/03* (2013.01); *H04W 72/1284* (2013.01); *H04L 1/1614* (2013.01); *H04L 1/1685* (2013.01); *H04L 1/1835* (2013.01)

(58) Field of Classification Search
CPC ....... H04L 69/03; H04L 69/04; H04L 1/1614; H04L 1/1685; H04L 1/1835; H04L 1/1832; H04L 1/1864; H04L 47/365
See application file for complete search history.

(56) References Cited

U.S. PATENT DOCUMENTS

| | | | | |
|---|---|---|---|---|
| 10,063,371 B2 * | 8/2018 | Agiwal | ................. | H04L 9/0861 |
| 2006/0251105 A1 * | 11/2006 | Kim | ..................... | H04L 1/1685 |
| | | | | 370/449 |

OTHER PUBLICATIONS

"Revision of SI: Study on New Radio Access Technology", 3GPP TSG-RAN meeting #73, RP-161596, Agenda: 9.2.2, NTT DOCOMO, Sep. 19-22, 2016, 7 pages.

"PDCP operation: SDU size and SN", 3GPP TSG-RAN Working Group 2 meeting #95bis, R2-166823, Agenda: 9.2.1.3, Ericsson, Oct. 10-14, 2016, pp. 1-3.

"3rd Generation Partnership Project; Technical Specification Group Radio Access Network; Evolved Universal Terrestrial Radio Access (E-UTRA); Packet Data Convergence Protocol (PDCP) specification (Release 14)", 3GPP TS 36.323, V14.0.1, Sep. 2016, pp. 1-39.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 14)", 3GPP TS 36.300, V14.0.0, Sep. 2016, pp. 1-314.

"PDCP SN extension in Rel-11", 3GPP TSG-RAN Working Group 2 meeting #79, R2-123432, Agenda: 7.1.4, Nokia Siemens, Aug. 13-17, 2012, 4 pages.

"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331, V14.0.0, Sep. 2016, pp. 1-644.

"Configuration of Extended L2 Header", 3GPP TSG-RAN Working Group 2 meeting #91bis, R2-154405, Agenda: 7.2.3.1, NTT DOCOMO, INC, Oct. 5-9, 2015, 5 pages.

"PDCP SN size change during HO for RLC-UM mode bearers", 3GPP TSG-RAN Working Group 2 meeting #87bis, R2-144657, Alcatel-Lucent, Oct. 6-10, 2014, 3 pages.

"3rd Generation Partnership Project; Technical Specification Group Radio Access Network; Evolved Universal Terrestrial Radio Access (E-UTRA); Radio Link Control (RLC) protocol specification (Release 13)", 3GPP TS 36322, V13.2.0, Jun. 2016, pp. 1-45.

"3rd Generation Partnership Project; Technical Specification Group Radio Access Network; Evolved Universal Terrestrial Radio Access Network (E-UTRAN); X2 application protocol (X2AP) (Release 14)", 3GPP TS 36.423, V14.0.0, Sep. 2016, pp. 1-239.

* cited by examiner

LOSSLESS BEARER RECONFIGURATION FROM USE OF LONGER TO SHORTER SEQUENCE NUMBER

BACKGROUND

Field

Various communication systems may benefit from appropriate handling of reconfiguration. For example, certain wireless communication systems may benefit from lossless bearer reconfiguration when handling a transition from the use of a longer sequence number to a shorter sequence number.

Description of the Related Art

There may be a transfer of a radio bearer from a third generation partnership project (3GPP) long term evolution (LTE) New Radio (NR) base station to an LTE evolved Node B (eNB) that has been updated to support, for example, an Xx interface (current 3GPP working name of the interface) towards an NR base station.

In reconfiguring the packet data convergence protocol (PDCP) sequence number (SN) length to a shorter value, at the core is the restriction in current PDCP operation that a PDCP transmitter shall not bring more than half of the used SN space in flight (i.e. pending acknowledgement of successful reception). As stated in the PDCP specification (3GPP TS 36.323, version 14.0.1—September 2016): "Associating more than half of the PDCP SN space of contiguous PDCP service data units (SDUs) with PDCP SNs, when e.g., the PDCP SDUs are discarded or transmitted without acknowledgement, may cause HFN desynchronization problem. How to prevent HFN desynchronization problem is left up to UE implementation." (36.323, at 5.1.1)

The reason is that a data-receiving PDCP entity relies on this restriction in inferring the hyper-frame number (HFN), specifically the most significant bits (MSBs) of the count value associated with each packet data unit (PDU) received. The PDCP SN, included explicitly in the PDCP header, indicates the least significant bits (LSBs) of the count value. Correct inference is required, for example, for correct deciphering and/or integrity verification of the received PDU, and ordered delivery of received data to higher layers.

Now, when the SN length is reconfigured to a shorter value, there can be more than half of the newly adopted space of SNs of PDUs in flight, which would also be reflected in the values of the state variables maintained by the PDCP entities involved, as defined in the specification at section 7.1, which is hereby incorporated herein by reference for the purpose of illustrating the background and not by way of limitation.

SUMMARY

In a first aspect thereof the exemplary embodiments of this invention provide a method that comprises receiving at least one service data unit in corresponding at least one protocol data unit, wherein each of the at least one service data unit is associated with a count value and a header of each of the at least one protocol data unit indicate a configured number of least significant bits of the count value associated with the service data unit carried by the protocol data unit; receiving an indication that a status report indicating reception status of service data units is to be transmitted; generating a status report in response to the indication, wherein the status report identifies a first service data unit expected to be received, using a number of bits that is independent of the configured number of least significant bits indicated in the header of each of the at least one protocol data units; and transmitting the status report.

In a further aspect thereof the exemplary embodiments of this invention provide an apparatus that comprises at least one data processor and at least one memory that includes computer program code. The at least one memory and computer program code are configured, with the at least one data processor, to cause the apparatus, at least to receive at least one service data unit in corresponding at least one protocol data unit, wherein each of the at least one service data unit is associated with a count value and a header of each of the at least one protocol data unit indicate a configured number of least significant bits of the count value associated with the service data unit carried by the protocol data unit; receive an indication that a status report indicating reception status of service data units is to be transmitted; generate a status report in response to the indication, wherein the status report identifies a first service data unit expected to be received, using a number of bits that is independent of the configured number of least significant bits indicated in the header of each of the at least one protocol data units; and transmit the status report.

In another aspect thereof the exemplary embodiments of this invention provide a non-transitory computer readable medium. The computer program configured to control a processor to perform receiving at least one service data unit in corresponding at least one protocol data unit, wherein each of the at least one service data unit is associated with a count value and a header of each of the at least one protocol data unit indicate a configured number of least significant bits of the count value associated with the service data unit carried by the protocol data unit; receiving an indication that a status report indicating reception status of service data units is to be transmitted; generating a status report in response to the indication, wherein the status report identifies a first service data unit expected to be received, using a number of bits that is independent of the configured number of least significant bits indicated in the header of each of the at least one protocol data units; and transmitting the status report.

BRIEF DESCRIPTION OF THE DRAWINGS

For proper understanding of the invention, reference should be made to the accompanying drawings, wherein.

DETAILED DESCRIPTION

Figure 1:
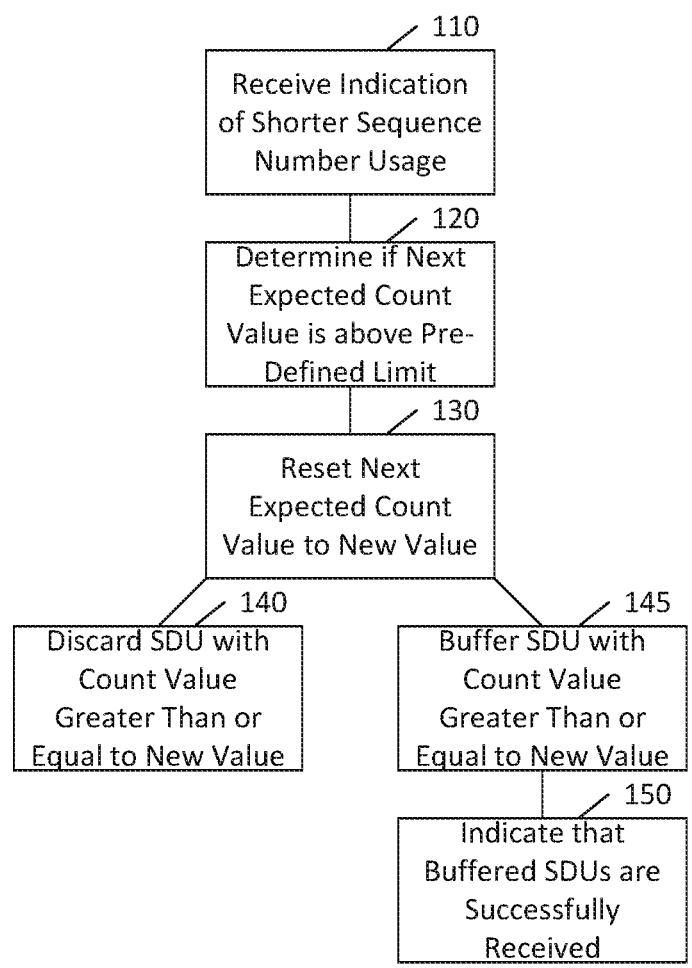
FIG. 1 illustrates a method according to certain embodiments.

As an example case of technical issues that can arise, a sequence number (SN) can be reconfigured to a length 2 bits shorter than the previously used length. In this case, half of the previously used SN space is four times the size of half the newly adopted SN space. Before the reconfiguration, a data-transmitting PDCP entity may have had the whole half of the previously used SN space of data in flight.

This half-space of the previously used SN space can be divided into four quadrants each the size of half the newly adopted SN space. In an example, at the data-transmitting PDCP entity before the reconfiguration in quadrant 1 (Q1), made up of the lowest count values associated with the SDUs, the PDCP entity can store SDUs whose acknowledgement is pending. In Q2 and Q3, the PDCP entity is no longer storing any SDUs because of a mass-discard of SDUs based on the PDCP discard timer. The PDCP entity may not know whether all, some, or none of these discarded SDUs have been received at the peer, data-receiving, PDCP entity. In Q4, the PDCP entity is storing SDUs whose acknowledgement is pending. In this example, at the peer, data-receiving, PDCP entity the lowest-numbered PDU not yet received is in Q2 defined above. Scattered PDUs have been received and stored in Q3 and Q4.

If the data-transmitting entity simply starts to retransmit SDUs in Q1 as instructed by the specification mentioned above, the data-receiving peer entity will conventionally misinterpret them as belonging to Q2 and will therefore infer the wrong HFN for those SDUs.

After the reconfiguration, a PDCP status report can be received from the peer entity and can include a first missing PDCP SN (FMS) value coupled with a reception-status bitmap. If, in line with the reconfiguration, the FMS in the report is expressed using the newly adopted, shorter SN and the bitmap included in the report is relatively short, the data-transmitting entity has no way of knowing the corresponding quadrant of the FMS.

Assuming that the data-transmitting entity has somehow learned that the FMS is in Q2, the entity has no SDU in that quadrant to re-transmit. As noted above, that quadrant was emptied by the mass-discard in this conventional example.

Certain embodiments, by contrast, provide for appropriate handling of reconfiguring the PDCP SN length of a radio bearer to a shorter value. In the following discussion, in line with an example use case, the procedure is performed at a transfer of the bearer from a source base station to a target base station. However, the procedure can be performed similarly in other contexts, with minor variations. For example, if the procedure is performed as a reconfiguration under a single base station, the source and target base stations may simply be the same, and there may be no need for information transfer between the two.

The source base station, such as a NR base station, of the bearer transfer can send similar information as in legacy-LTE operation, to the target base station. For example, the source base station can send the information currently specified within SN Status Transfer message in the X2AP specification, TS 36.423 to the target base station. The information can include a count value of the first missing uplink SDU, a bitmap indicating reception status of uplink SDUs following that count value, and a count value that the target eNB should assign for the next DL SDU not having an SN yet. The source base station can also send uplink and downlink PDCP SDUs that the source base station chooses to forward to the target, along with PDCP SN, which can be of the length used at the source, if any are associated with those SDUs.

PDCP entities are typically bi-directionally communicating with other similar PDCP entities, with no entity exclusively transmitting or receiving. Nevertheless, certain of the following features or roles are described with respect to a data-receiving entity and other features or roles are described with respect to a data-transmitting entity, although both features and roles may be applicable to respective devices in their multiple capacities.

At a data-receiving PDCP entity, a set of actions can occur if the count value {RX_HFN, Next_PDCP_RX_SN} (formed from the state variables that applied before the procedure) is more than some pre-defined limit ahead of the count value associated with the SDU most recently delivered to the upper layers, whose PDCP SN may be stored in the variable Last_Submitted_PDCP_RX_SN. The pre-defined limit can be, for example, 1+the new shorter Reordering_Window. Reordering_Window can equal half the PDCP-SN space being applied, as in the current PDCP specification, or to some other value.

The set of actions can include, first, in the state variables that apply after the procedure, setting back the count value {RX_HFN, Next_PDCP_RX_SN} to a pre-defined upper limit. The pre-defined upper limit can be, for example, equal to count value associated with the SDU most recently delivered to the upper layers+1+the new shorter Reordering_Window. This action may force the count value {RX_HFN, Next_PDCP_RX_SN} to keep within its maximum allowed value, relative to Last_Submitted_PDCP_RX_SN, with the new SN length. This action can also ensure correct HFN inference for PDUs to be received, assuming that they are sent in a disciplined enough manner, as discussed below.

The set of actions can also include, second, discarding previously received and stored SDUs whose associated count value is greater than or equal to the new value of {RX_HFN, Next_PDCP_RX_SN} set in the previous action. This action may enable the data-transmitting entity to re-transmit SDUs re-numbered, without violating the provision of duplicate elimination and ordered delivery of higher-layer data.

There can be some alternatives to the set of actions described above. For example, in certain embodiments the device can keep buffering previously received and stored SDUs whose associated count value is greater than or equal to the new value of {RX_HFN, Next_PDCP_RX_SN}. A PDCP status report can be sent, indicating these buffered SDUs with the higher count values as successfully received. The length of the bitmap in the report does not need to be limited to the new Reordering_Window. These optimizations may be possible if, for example, it is known that the data-transmitting entity will not re-transmit SDUs re-numbered. For example, the data-transmitting entity can be configured to avoid performing an excessively big mass discard of SDUs.

These actions can have corresponding features at a target base station, such as an LTE eNB. For example, the target base station can take a set of actions if the highest count value indicated as received by the source base station is some pre-defined limit or more ahead of the count value of the first missing uplink SDU as indicated by the source base station. The predefined limit can be, for example, the new shorter Reordering_Window.

The actions can include first, in the state variables that apply after the procedure, setting back the count value {RX_HFN, Next_PDCP_RX_SN} to a pre-defined upper limit. The predefined upper limit can be, for example, equal to count value of the first missing uplink SDU+the new shorter Reordering_Window. Otherwise, the count value can be set to 1+highest count value indicated as received by the source base station, as usual. The second action can be the same as the second action described above.

As mentioned above, PDCP entities can typically bi-directionally communicate with other similar PDCP entities, with no entity exclusively transmitting or receiving. Nevertheless, certain of the features above were described with respect to a data-receiving entity and other features or roles will be described below with respect to a data-transmitting entity, although both features and roles may be applicable to respective devices in their multiple capacities.

At a data-transmitting PDCP entity, a set of actions can occur if, at the time of the reconfiguration, the count value {TX_HFN, Next_PDCP_TX_SN} (formed from the state variables that applied before the procedure) is more than some pre-defined limit ahead of the lowest count value associated with an SDU for which confirmation of successful delivery is still expected. The pre-defined limit may be, for example, the new shorter Reordering_Window.

The set of actions can include, first, refraining from retransmitting SDUs until receiving an indication of a first SDU missing at the peer entity. This indication of first missing SDU can be provided with an accuracy greater than the newly adopted, shorter SN length. As one option, the first missing SDU could be indicated as a whole count value, as opposed to only the most significant bits or only the least significant bits.

The set of actions can also include, second, taking additional actions if, even after performing the previous, the count value {TX_HFN, Next_PDCP_TX_SN} is more than some pre-defined limit ahead of the lowest count value associated with an SDU for which confirmation of successful delivery is still expected. The predefined limit can be, for example, the new shorter Reordering_Window. The additional actions can include, in the state variables that apply after the procedure, set back the count value {TX_HFN, Next_PDCP_TX_SN} to a pre-defined upper limit. The predefined upper limit can be, for example, equal to lowest count value associated with an SDU for which confirmation of successful delivery is still expected+the new shorter Reordering_Window.

The additional actions can also include de-associating, with any count values, any SDUs whose associated count value is greater than or equal to the new value of {TX_HFN, Next_PDCP_TX_SN} set in the previous action. Together these additional actions may ensure using the next available count value for the ciphering and/or integrity protection of an SDU that can be transmitted, and may allow retransmitting at least one SDU re-numbered.

There can be some alternatives to the set of actions described above. For example, instead of performing the additional actions, the transmitting entity can receive, in a possible PDCP status report, a confirmation of successful delivery of SDUs with count value beyond the pre-defined limit. The length of the bitmap in the report does not need to be limited to the new Reordering_Window, These optimizations may be possible if, for example, it is known that the data-transmitting entity will not re-transmit SDUs re-numbered. These optimizations can, therefore, take place together with the alternative optimizations described above for the data-receiving PDCP entity.

To keep the procedure lossless, the devices can refrain from discarding from transmission buffers any SDUs, at least with respect to the reconfiguration process itself. Other triggers such as timer-based discarding can still be applied. Rather, such SDUs should be kept buffered and ordered according to their previously assigned count values. This applies regardless of whether or not the additional actions above are performed.

Re-transmission of SDUs re-numbered implies reusing previously used count values for different SDUs, which may raise security concerns. For this reason, the procedure can be coupled with ciphering-key change or other such measures to avoid compromising security.

These actions can have corresponding features at a target base station, such as an LTE eNB. If, at the time of the reconfiguration, the count values associated with downlink SDUs forwarded by the source base station span more than some pre-defined range limit, then the following actions can be taken. The predefined range limit can be, for example, the new shorter Reordering_Window. The first action can be the same as already discussed above. The second action can include, if, even after performing the previous, the "next downlink count value" indicated by the source base station is more than some pre-defined limit (such as the new shorter Reordering_Window) ahead of the lowest count value associated with a downlink SDU forwarded by the source base station, then the second set of actions discussed above can be performed. If there is no need to set back the count value {TX_HFN, Next_PDCP_TX_SN}, the count value can be set to the "next downlink count value" as indicated by the source base station, as usual.

The above illustrative embodiments can be variously implemented. For a user equipment, the actions described above can be specified in LTE and/or NR versions of the PDCP specification. For the target base station the actions may or may not be specified. If specified, they could be captured in the signaling-interface application protocol, such as X2AP TS 36.423 and/or its future equivalents.

Certain embodiments may have various benefits and/or advantages. For example, certain embodiments can provide a way for PDCP SN length to be reconfigured to a shorter value without requiring any data loss to accommodate the shortened SN length.

While not limiting the scope of this invention, an example use case of interest is the transfer of a radio bearer from a 3GPP New-Radio (NR) base station to an LTE eNB that has been updated to support, for example, the interface towards an NR base station.

FIG. 1 illustrates a method according to certain embodiments. The illustrated method may be performed by a data-receiving PDCP entity. As shown in FIG. 1, a method can include, at 110, receiving an indication that a new shorter sequence number length is to be taken into use in headers of protocol data units.

The method can also include, at 120, determining, by a protocol entity, if a next expected highest count value among count values associated with protocol data units received (this can correspond to {RX_HFN, Next_PDCP_RX_SN} in the discussion above) is more than a pre-defined limit ahead of a lowest count value among count values associated with protocol data units expected to be received (this can correspond to the Last_Submitted_PDCP_RX_SN in the discussion above, plus 1). There is a possibility that PDCP does not deliver data in order.

The method can further include, at 130, resetting the next expected highest count value to a new value corresponding to a predefined upper limit, conditional on the determination.

The method can additionally include, at 140, discarding any service data units having associated count values greater than or equal to the new value. Alternatively, the method can also include, at 145, keeping service data units having associated count values greater than or equal to the new value buffered. The method can further include, at 150, indicating in a status report that the buffered service data units are successfully received.

Figure 2:
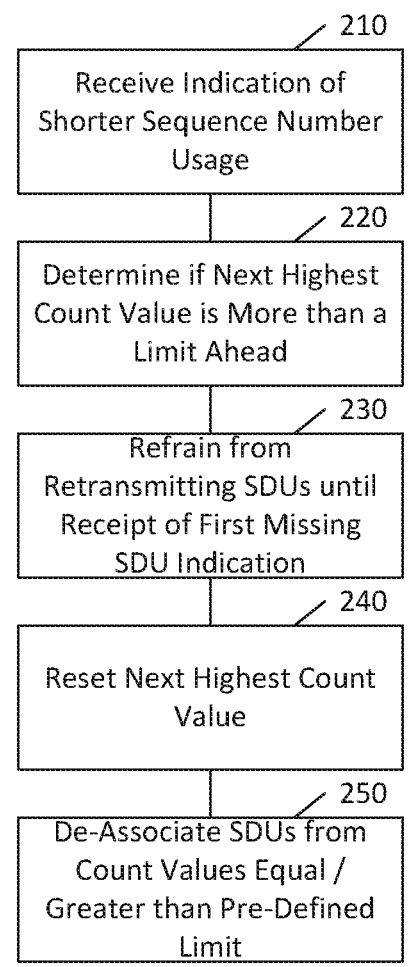
FIG. 2 illustrates another method according to certain embodiments.

FIG. 2 illustrates a method according to certain embodiments. The illustrated method may be performed by a data-transmitting PDCP entity. As shown in FIG. 2, a method can include, at 210, receiving an indication that a new shorter sequence number length is to be taken into use in headers of protocol data units. This can be the same indication received at 110, and discussed above. Thus, for example, the method of FIG. 2 and FIG. 1 can be combined with one another and used in combination.

The method can also include, at 220, determining, by a protocol entity, if a next highest count value among count values associated with protocol data units transmitted (this can correspond to {TX_HFN, Next_PDCP_TX_SN} in the discussion above) is more than a pre-defined limit ahead of a lowest count value among count values associated with service data units for which confirmation of successful delivery is expected.

The method can further include, at 230, refraining from retransmitting service data units until receipt of an indication of a first missing SDU, based on the determination.

Conditional on the determination at 220, at 240, the method can include resetting the next highest count value to a new value corresponding to a predefined upper limit. The method can also include, at 250, de-associating from respective count values any service data units that have an associated count value greater than or equal to the pre-defined limit.

In the above discussion, reference to various PDCP variables or constants was made, by way of example. Last_Submitted_PDCP_RX_SN can refer to a PDCP state variable corresponding to the last PDCP SDU delivered to the upper layer. The reordering window size can correspond to a Reordering_Window PDCP constant. Next_PDCP_TX_SN can indicate the PDCP SN of the next PDCP SDU for a given PDCP entity, whereas correspondingly Next_PDCP_RX_SN can indicate a next expected PDCP SN by a receiver for a given PDCP entity. RX_HFN can indicate an HFN value for the generation of the COUNT value used for the received PDCP PDUs for a given PDCP entity, and similarly TX_HFN can indicate an HFN value for the generation of the COUNT value used for transmitted PDCP PDUs for a given PDCP entity. These should be understood to be non-limiting examples of constants and variables that can be used in connection with various embodiments.

Figure 3:
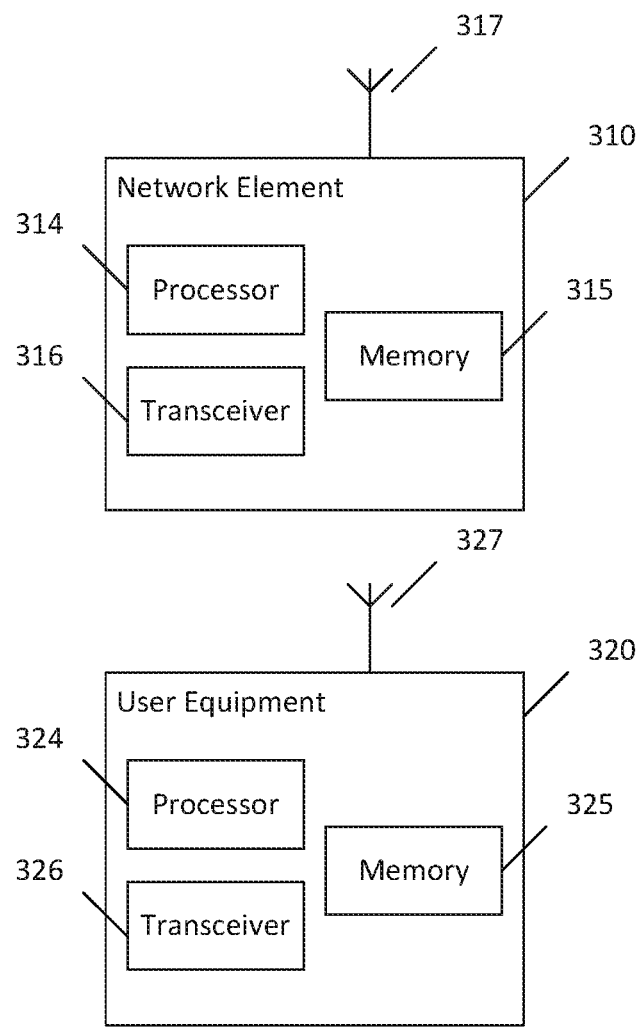
FIG. 3 illustrates a system according to certain embodiments.

FIG. 3 illustrates a system according to certain embodiments of the invention. It should be understood that each block of the flowchart of FIG. 1 or FIG. 2 may be implemented by various means or their combinations, such as hardware, software, firmware, one or more processors and/or circuitry. In one embodiment, a system may include several devices, such as, for example, network element 310 and user equipment (UE) or user device 320. The system may include more than one UE 320 and more than one network element 310, although only one of each is shown for the purposes of illustration. A network element can be an access point, a base station, an eNode B (eNB), or any other network element, such as any device configured to operate using a packet data convergence protocol.

Each of these devices may include at least one processor or control unit or module, respectively indicated as 314 and 324. At least one memory may be provided in each device, and indicated as 315 and 325, respectively. The memory may include computer program instructions or computer code contained therein, for example for carrying out the embodiments described above. One or more transceiver 316 and 326 may be provided, and each device may also include an antenna, respectively illustrated as 317 and 327. Although only one antenna each is shown, many antennas and multiple antenna elements may be provided to each of the devices. Other configurations of these devices, for example, may be provided. For example, network element 310 and UE 320 may be additionally configured for wired communication, in addition to wireless communication, and in such a case antennas 317 and 327 may illustrate any form of communication hardware, without being limited to merely an antenna.

Transceivers 316 and 326 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is provided as software that can run on a server.

A user device or user equipment 320 may be a mobile station (MS) such as a mobile phone or smart phone or multimedia device, a computer, such as a tablet, provided with wireless communication capabilities, personal data or digital assistant (PDA) provided with wireless communication capabilities, vehicle, portable media player, digital camera, pocket video camera, navigation unit provided with wireless communication capabilities or any combinations thereof. The user device or user equipment 320 may be a sensor or smart meter, or other device that may usually be configured for a single location.

In an exemplifying embodiment, an apparatus, such as a node or user device, may include means for carrying out embodiments described above in relation to FIG. 1 or FIG. 2.

Processors 314 and 324 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof. The term circuitry may refer to one or more electric or electronic circuits. The term processor may refer to circuitry, such as logic circuitry, that responds to and processes instructions that drive a computer.

For firmware or software, the implementation may include modules or units of at least one chip set (e.g., procedures, functions, and so on). Memories 315 and 325 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 310 and/or UE 320, to perform any of the processes described above (see, for example, FIG. 1 and FIG. 2). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 3 illustrates a system including a network element 310 and a UE 320, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

LIST OF ABBREVIATIONS

3GPP Third Generation Partnership Project
AM Acknowledged Mode
DL Downlink
DRB Data Radio Bearer
eNB evolved Node B
FMS First Missing PDCP SN
HFN Hyper-Frame Number
LTE Long Term Evolution
MCG Master Cell Group
NR New Radio
PDCP Packet Data Convergence Protocol
PDU Protocol Data Unit
SCG Secondary Cell Group
SDU Service Data Unit
UE User Equipment
UL Uplink
RX_HFN Received hyper-frame number
TX_HFN Transmitted hyper-frame number
SN Sequence Number According to a first embodiment, a method can include determining, by a protocol entity, if a next expected highest count value among count values associated with protocol data units received is more than a pre-defined limit ahead of a lowest count value among count values associated with protocol data units expected to be received. The method can also include resetting the next expected highest count value to a new value corresponding to a predefined upper limit, conditional on the determination.

In a variant, the method can further include discarding service data units having associated count values greater than or equal to the new value.

In a variant, the method can additionally include keeping service data units having associated count values greater than or equal to the new value buffered.

In a variant, the method can also include indicating in a status report that the buffered service data units are successfully received.

In a variant, the method can further include receiving an indication that a new shorter sequence number length is to be taken into use in headers of protocol data units.

According to a second embodiment, a method can include determining, by a protocol entity, if a next highest count value among count values associated with protocol data units transmitted is more than a pre-defined limit ahead of a lowest count value among count values associated with service data units for which confirmation of successful delivery is expected. The method can also include refraining from retransmitting service data units until receipt of an indication of a first missing service data unit, based on the determination.

In a variant, the method can additionally include determining if a next highest count value among count values associated with protocol data units transmitted is more than a pre-defined limit ahead of a lowest count value among count values associated with service data units for which confirmation of successful delivery is expected. Conditional on this further determination, the method can further include resetting the next highest count value to a new value corresponding to a predefined upper limit. The method can also include de-associating from respective count values service data units that have an associated count value greater than or equal to the pre-defined limit.

In a variant, the method can additionally include receiving an indication that a new shorter sequence number length is to be taken into use in headers of protocol data units.

According to third and fourth embodiments, an apparatus can include means for performing the method according to the first and second embodiments respectively, in any of their variants.

According to fifth and sixth embodiments, an apparatus can include at least one processor and at least one memory including computer program code. The at least one memory and the computer program code can be configured to, with the at least one processor, cause the apparatus at least to perform the method according to the first and second embodiments respectively, in any of their variants.

According to seventh and eighth embodiments, a computer program product may encode instructions for performing a process including the method according to the first and second embodiments respectively, in any of their variants.

According to ninth and tenth embodiments, a non-transitory computer readable medium may encode instructions that, when executed in hardware, perform a process including the method according to the first and second embodiments respectively, in any of their variants.

What is claimed is:

1. A method comprising:
receiving at least one service data unit corresponding with at least one protocol data unit,
wherein each of the at least one service data unit is associated with a count value and a header of each of the at least one protocol data unit indicates a configured number of least significant bits of the count value associated with the service data unit carried by the protocol data unit;

receiving an indication that a status report indicating reception status of service data units is to be transmitted;

buffering received and stored service data units whose associated count value are greater than or equal to a new value of at least one next expected count value;

generating a status report in response to the indication, wherein the status report identifies a first service data unit expected to be received, using a number of bits that is independent of the configured number of least significant bits indicated in the header of each of the at least one protocol data units, and comprises an indication, via a bitmap, that the buffered service data units with higher or equal count values have been successfully received, wherein the length of the bitmap is larger than a reordering window size; and transmitting the status report.

2. The method as in claim 1, further comprising:

receiving an indication that a new shorter sequence number length is to be taken into use in the headers of the protocol data units.

3. The method as in claim 2, wherein the indication of the first service data unit expected to be received is provided with an accuracy greater than the new shorter sequence number length.

4. The method as in claim 3, wherein the first service data unit expected to be received is indicated as a whole count value.

5. An apparatus, comprising:

at least one processor; and at least one memory including computer program instructions, wherein the at least one memory and computer program instructions are configured to, with the at least one processor, cause the apparatus at least to:

receive at least one service data unit corresponding with at least one protocol data unit, wherein each of the at least one service data unit is associated with a count value and a header of each of the at least one protocol data unit indicates a configured number of least significant bits of the count value associated with the service data unit carried by the protocol data unit;

receive an indication that a status report indicating reception status of service data units is to be transmitted;

buffer received and stored service data units whose associated count value are greater than or equal to a new value of at least one next expected count value;

generate a status report in response to the indication, wherein the status report identifies a first service data unit expected to be received, using a number of bits that is independent of the configured number of least significant bits indicated in the header of each of the at least one protocol data units, and comprises an indication, via a bitmap, that the buffered service data units with higher or equal count values have been successfully received, wherein the length of the bitmap is larger than a reordering window size; and transmit the status report.

6. The apparatus as in claim 5, further wherein the at least one memory and computer program instructions are further configured to, with the at least one processor, cause the apparatus at least to:

receive an indication that a new shorter sequence number length is to be taken into use in the headers of the protocol data units.

7. The apparatus as in claim 6, wherein the indication of the first service data unit expected to be received is provided with an accuracy greater than the new shorter sequence number length.

8. The apparatus as in claim 7, wherein the first service data unit expected to be received is indicated as a whole count value.

9. A computer program, embodied on a non-transitory computer readable medium, the computer program configured to control a processor to perform:

receiving at least one service data unit corresponding with at least one protocol data unit, wherein each of the at least one service data unit is associated with a count value and a header of each of the at least one protocol data unit indicates a configured number of least significant bits of the count value associated with the service data unit carried by the protocol data unit;

receiving an indication that a status report indicating reception status of service data units is to be transmitted;

buffering received and stored service data units whose associated count value are greater than or equal to a new value of at least one next expected count value;

generating a status report in response to the indication, wherein the status report identifies a first service data unit expected to be received, using a number of bits that is independent of the configured number of least significant bits indicated in the header of each of the at least one protocol data units, and comprises an indication, via a bitmap, that the buffered service data units with higher or equal count values have been successfully received, wherein the length of the bitmap is larger than a reordering window size; and transmitting the status report.

10. The computer program as in claim 9, further configured to control the processor to perform:

receiving an indication that a new shorter sequence number length is to be taken into use in the headers of the protocol data units.

11. The computer program as in claim 10, wherein the indication of the first service data unit expected to be received is provided with an accuracy greater than the new shorter sequence number length.

* * * * *